United States Patent
Figueira

(10) Patent No.: US 7,555,579 B2
(45) Date of Patent: Jun. 30, 2009

(54) IMPLEMENTING FIFOS IN SHARED MEMORY USING LINKED LISTS AND INTERLEAVED LINKED LISTS

(75) Inventor: Norival R. Figueira, Campbell, CA (US)

(73) Assignee: Nortel Networks Limited, St. Laurent, Quebec (CA)

(*) Notice: Subject to any disclaimer, the term of this patent is extended or adjusted under 35 U.S.C. 154(b) by 517 days.

(21) Appl. No.: 10/850,886

(22) Filed: May 21, 2004

(65) Prior Publication Data

US 2006/0031643 A1    Feb. 9, 2006

(51) Int. Cl.
*G06F 5/00*    (2006.01)
(52) U.S. Cl. .................................. 710/52; 711/202
(58) Field of Classification Search .............. None
See application file for complete search history.

(56) References Cited

U.S. PATENT DOCUMENTS

| | | | |
|---|---|---|---|
| 6,754,742 B1* | 6/2004 | Alowersson et al. | 710/53 |
| 6,754,744 B2* | 6/2004 | Kim et al. | 710/56 |
| 6,760,795 B2* | 7/2004 | Goudie et al. | 710/56 |
| 6,888,848 B2* | 5/2005 | Beshai et al. | 370/474 |
| 7,342,934 B1* | 3/2008 | Mott et al. | 370/412 |

* cited by examiner

*Primary Examiner*—Gary J Portka
(74) *Attorney, Agent, or Firm*—Anderson Goreki & Manaras LLP

(57) ABSTRACT

FIFOs may be implemented in shared memory using linked lists and interleaved linked lists such that any individual FIFO can dynamically use any free memory location. The system may be implemented in hardware efficiently and does not pre-allocate memory to any FIFO, so that the whole shared memory may be used by any one of the FIFOs. The maximum physical size of a FIFO is then limited only by the size of the physical memory and not by the number of FIFOs sharing the same physical memory or by any mechanism for pre-allocating physical memory to the FIFOs. The linked lists contain data words, each data word containing a data field and a reference to a subsequent free memory location. A subsequent data word may be enqueued to the FIFO at the last referenced free memory location. A dequeue operation returns free memory locations to the free memory pool. Multiple linked lists may be interleaved to accelerate reading of data words from the FIFO.

12 Claims, 5 Drawing Sheets

IMPLEMENTING FIFOS IN SHARED MEMORY USING LINKED LISTS AND INTERLEAVED LINKED LISTS

BACKGROUND OF THE INVENTION

1. Field of the Invention

The present invention relates to communication networks and, more particularly, to a method and apparatus for implementing FIFOs in shared memory using linked lists and interleaved linked lists.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

A network element may have many ports, each of which may maintain multiple data queues. For example, a network element may maintain an input queue at an input port for each output port, each flow, or in a number of other manners. Maintaining different queues for different classes or types of traffic allows the network element to treat the different classes of traffic differently. Queuing at the input port allows data received over the port to be held until the output port is ready to output the data. In a conventional system, each queue is typically configured as a First In First Out (FIFO) queue which is statically allocated a particular range of memory locations in a common memory.

The static allocation of memory to queues requires the network element to have a large amount of memory to implement the queues. Specifically, not every port on a network element may be receiving data at the same rate. In this instance, a particular FIFO may fill to the point where it is unable to store additional protocol data units and will need to start dropping protocol data units, even though other FIFOs remain relatively empty. To accommodate reasonably large bursts of data, the memory must be increased to be able to allocate sufficient memory to each queue. As the number of queues grows, to allow the network element to assert increased control over the traffic, the memory requirements grow accordingly. While it would be desirable to allow the FIFOs on a network element to dynamically adjust their size as their needs changed, implementing FIFOs with an adjustable size has conventionally been unfeasible in hardware. Since the rate at which data arrives on a network element is quite high, implementing a software solution or moving data around within the memory to accommodate the new FIFO size demarcations is generally not a practicable solution.

SUMMARY OF THE INVENTION

The present invention overcomes these and other drawbacks by providing a method and apparatus for implementing FIFOs in shared memory using linked lists and interleaved linked lists. According to an embodiment of the invention, a number of FIFOs may be implemented to share a common physical memory in such a way that any individual FIFO can dynamically use any free memory location. The system may be implemented in hardware efficiently and does not pre-allocate memory to any FIFO so that the whole shared memory is considered a pool of free memory to be used by any one of the FIFOs. The maximum physical size of a FIFO is then limited only by the size of the physical memory and not by the number of FIFOs sharing the same physical memory or by any mechanism for pre-allocating physical memory to the FIFOs. Linked lists containing data words with references to subsequent FIFO location are used to implement an embodiment of the invention. Multiple linked lists may be interleaved as well to accelerate reading of data words from the FIFO.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
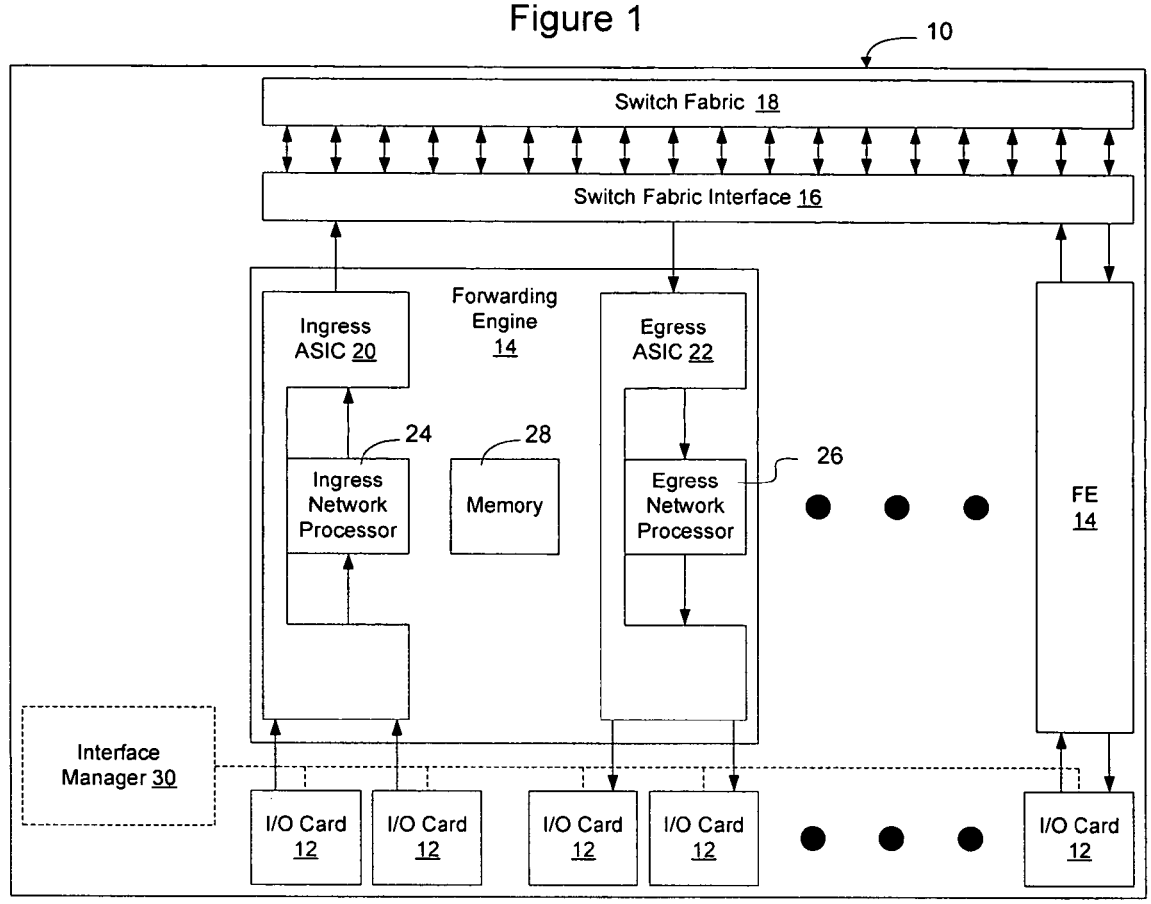
FIG. 1 is a functional block diagram of a network element according to an embodiment of the invention.

FIG. 1 illustrates one embodiment of a network element 10 that may be configured to implement an embodiment of the invention. The invention is not limited to a network element configured as illustrated, however, as the invention may be implemented on a network element configured in many different ways. The discussion of the specific structure and methods of operation of the embodiment illustrated in FIG. 1 is intended only to provide one example of how the invention may be used and implemented in a particular instance. The invention more broadly may be used in connection with any network element configured to handle protocol data units on a communications network. The network element of FIG. 1 may be configured to be used in many different areas of a communication network to handle traffic on the network.

As shown in FIG. 1, a network element 10 generally includes Input/Output (I/O) cards 12 configured to connect to links on the communications network. One example of an I/O card will be described in greater detail below in connection with FIG. 2. One or more forwarding engines 14 are provided in the network element to process frames received over the I/O cards 12. The forwarding engines 14 forward the received frames to a switch fabric interface 16, which passes the frames to a switch fabric 18. The data may be logically associated into packets, frames, segments, or into another type of protocol data unit. Although reception of a frame will be used to illustrate an embodiment of the invention, the invention is not limited in this manner as the network element may similarly operate on any other type of protocol data unit. The switch fabric 18 enables a frame entering on a port on an I/O card 12 to be output at a different port on the same or a different I/O card in a conventional manner.

A packet returning from the switch fabric 18 is received by one of the forwarding engines 14 and passed to one or more of the I/O cards 12. The packet may be handled by the same forwarding engine 14 on both the ingress and egress paths. Optionally, where more than one forwarding engine 14 is included in the network element 10, a given packet may be handled by different forwarding engines on the ingress and egress paths. The invention is not limited to any particular forwarding engine 14, switch fabric interface 16, or switch fabric 18, but rather may be implemented in any suitable network element configured to handle packets from data flows on a network. One or more Application Specific Integrated Circuits (ASICs) 20, 22 and processors 24, 26 may be provided as well to implement instructions and processes on the forwarding engines 14. Optionally, a memory 28 may be included to store data and instructions for use by the forwarding engines.

An interface manager 30 and other control plane components may be provided to establish an environment for creation of interfaces over the ports on the I/O cards, and otherwise control operation of the I/O cards and forwarding engines. The invention is not limited to a particular control plane structure or the manner in which the transport plane, including the I/O cards, forwarding engines, and switch fabric components, are controlled or managed in the network element 10.

Figure 2:
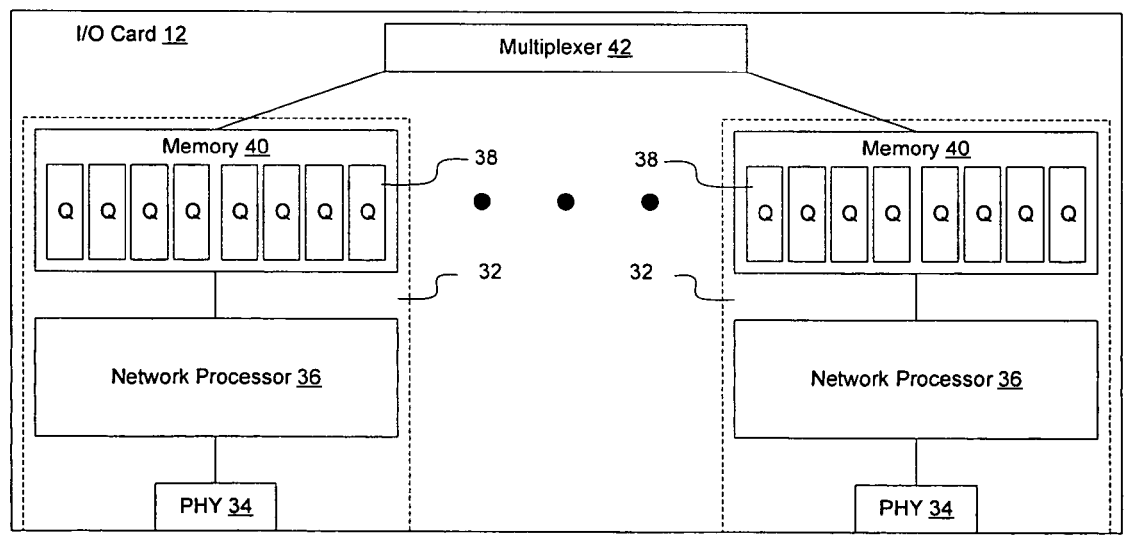
FIG. 2 is a functional block diagram of an I/O card that may be used in a network element, such as the network element of FIG. 1, according to an embodiment of the invention.

FIG. 2 illustrates an example of an I/O card 12 that may be used in the network element of FIG. 1. As shown in FIG. 2, the I/O card in this example includes several ports 32, each of which includes one or more physical interfaces 34 such as an optical port, electrical port, wireless port, infrared port, or ports configured to communicate with other conventional physical media. The port 32 also includes a network processor 36 or other type of configurable logical element to enable the port 32 to operate as a MAC (layer 2) port under the direction of the interface manager 30. For example, the network processor 36 may be configured to perform a service label lookup or an IP lookup on a received packet to determine an egress port for the received packet. The invention is not limited in this manner, however, as other processing may be performed by the network processor 36.

Frames received at the port 32 are processed by the network processor 36 and placed in queues 38 in a memory 40 to be output via multiplexer 42 to the remainder of the processing circuitry such as to forwarding engines 14 of the network element 10.

The queues may be formed in shared memory to minimize the number of memory modules that must be used to implement the port 32. A given port may be required to maintain multiple queues to enable the network element to maintain control over how traffic is handled on the network element. For example, the network element may want traffic to be queued at the ingress port on a per-egress port basis. In this scheme, the ingress port would determine an egress port for an incoming received packet and place the packet in an queue in the shared memory for the particular egress port. Queuing packets in the input card on a per egress port basis allows each input port card to output some traffic over a particular egress port in a fair manner and provides sundry other benefits. There are many different queuing strategies that may be employed to enable traffic to be controlled on the ingress and egress ports. For example, packets may be queued on a per input port basis, per flow basis, or in many other ways. The invention is not limited to a particular queuing strategy. Additionally, frames may be queued at the egress ports as well as at the ingress ports. These queues may share the same memory 40 with the ingress queues or may be provided with their own memory.

Queues are used in other contexts within a network element as well. For example, in a network element, data frames are usually transmitted between internal modules using internal data buses. A data bus here may be represented by the communication signals between chips within a same board or between chips on separate boards. Whenever a data bus may experience momentary contention, i.e., periods of time in which there is more data to be sent through the data bus than the data bus can handle, data frames may be queued (i.e., stored in memory) to avoid being dropped. Analogously, whenever a data link may experience momentary contention in a data network, data frames may be queued to avoid being dropped.

When frames are queued, a queue service policy is required to determine which frame will be served next among all the frames stored in the memory. A simple scheduling policy is to serve frames in first-come-first-served order, where frames are served in the order in which they arrived at the memory. That is, the first stored frame is served first followed by the second stored frame and so on. A data structure designed to provide access to frames in this manner is called a first-in-first-out (FIFO) queue.

As discussed above, if a shared memory is divided into a plurality of physical memories in a rigid fashion, the shared memory may not be fully used since one of the queues may be full while another of the queues may be empty. In this event, a rigidly partitioned shared memory will cause packets destined to a full queue to be dropped, even though the memory as a whole contains empty memory locations and is thus capable of storing additional data words. Additionally, this requires the memory to be over-sized to enable sufficient memory space to be allocated to each queue. According to an embodiment of the invention, new queue structures referred to herein as linked lists and interleaved linked lists are used to form the queues 38 in the shared memory 40 to allow the shared memory to be used to store incoming packets or other types of protocol data units in a way that allows the queue size to be adjusted dynamically as required.

Figure 3:
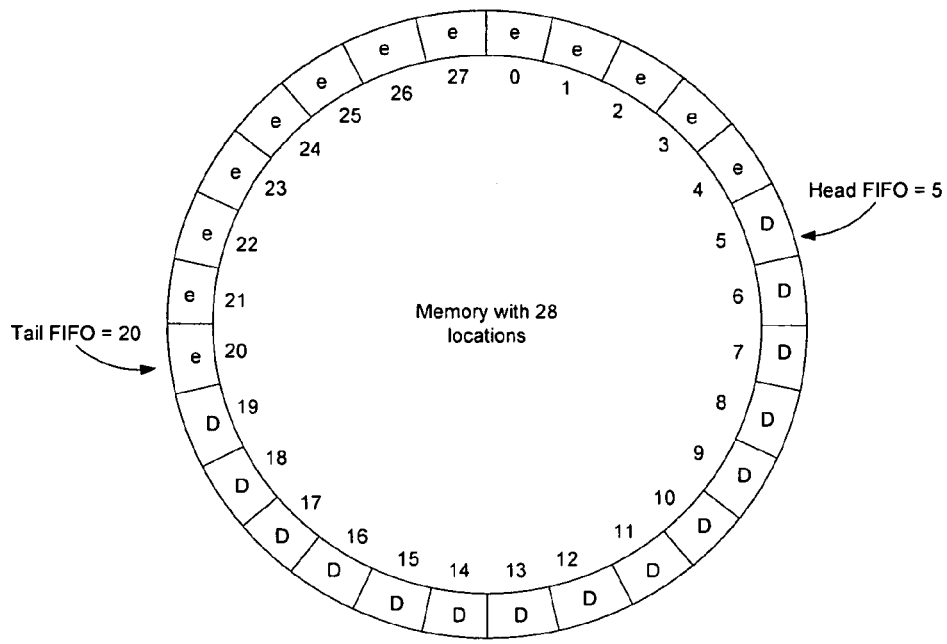
FIG. 3 is a functional block diagram of a conventional FIFO structure.

An example of a conventional algorithm to implement a simple FIFO queue using a dual-port memory is depicted in FIG. 3. To simplify explanation of the concepts associated with the invention, the following discussion will assume that a dual-port shared memory is being used. A dual-port memory has one read port and one write port, where the two ports are independent, i.e., they have separate data, address, and control signals, and allow for concurrent read and write operations to take place in a same clock cycle of the memory controller. Other types of memory, for example single-port memory, can be "wrapped" by a control layer that creates the abstraction of a dual-port memory used in this example. Thus, a single-port memory can be made to appear as a dual-port memory by running the memory with a clock frequency twice as fast as the clock used for the memory controller, and using odd clock cycles for writes and even clock cycles for reads (or vice-versa). In effect, the memory would then allow one write and one read access per clock cycle of the memory controller. The invention is not limited to a particular memory structure or to a particular manner of controlling the memory.

The memory can be composed of a single chip or bank, or multiple chips or banks connected in series or parallel. The invention is not limited to a particular type of memory. Thus, the invention may be used with static memory, dynamic memory, or memory that is pipelined or not pipelined. Where dynamic memory is used, a portion of the clock cycles will be reserved to perform memory refresh operations, which will reduce the throughput of data from the memory.

In the following description, it will be assumed that the memory is configured to allow a concurrent enqueue operation (i.e., saving of a frame in the FIFO) and dequeue operation (i.e., extraction of a frame from the FIFO). While the following description will focus on the handling of frames, the invention is not limited to an embodiment that is configured to handle frames as other types of protocol data units such as packets or segments may be handled as well.

FIFOs that are configured to store data words will be referred to herein as data FIFOs. In the following discussion, frame delineation will be assumed to be done independently from data word storage, thus a given frame may span multiple data words in the FIFO. For example, one way to handle frame delineation is to use a separate size FIFO for each data FIFO. A size FIFO stores the sizes of all the frames stored in its corresponding data FIFO, and can be embedded into the data FIFO controller or elsewhere in the memory. Size FIFOs provide advance information related to the sizes of the frames stored in the data FIFO. This advance size information may be required by certain scheduling policies, e.g., deficit round robin. Another way to handle frame delineation is to increase the memory width of the data FIFO to include control bits. These control bits can be used to flag the beginning and end of data frames, and can also be used to indicate which bytes of a memory word contain data. This is useful when the size of a frame in bytes is not a multiple of the number of bytes in a memory word. As frame delineation is handled separately, the rest of the discussion will be restricted to explaining the storing of data words irrespective of frame boundaries.

FIG. 3 illustrates a conventional FIFO having 28 allocated memory locations. This FIFO queue has a defined length which is not easy to modify to allow the queue length to vary depending on the amount of traffic to be input to the queue. In FIG. 3, the variables head_fifo and tail_fifo can be implemented as hardware registers in a FIFO controller. An enqueue operation causes a frame to be written to the FIFO, and a dequeue operation causes a frame to be read from the FIFO.

When an enqueue operation is issued, the provided data word is written to the FIFO memory at the position addressed by the content of the tail_fifo register, and the tail_fifo register is incremented by 1. If the tail_fifo register advances beyond the end of the memory (in the example this would be indicated by having a new tail_fifo register equal to 28), the tail_fifo register is set to 0 (that is the tail_fifo register is set to the remainder of (tail_fifo+1) divided by the memory size).

When a dequeue operation is issued, the content of the memory position addressed by the head_fifo register is returned, and the head_fifo register is incremented in the same way as the tail_fifo register. FIFO errors such as reading from an empty FIFO or writing to a full FIFO are easily identifiable and available by comparing the contents of the tail_fifo and head_fifo registers, or by keeping a counter of the number of words stored in the FIFO. To avoid such errors, FIFOs usually provide additional signals to indicate if the FIFO is full or empty, has only one data word stored in it, or has only one memory location left to store a data word. These convenience signals are not shown here, but are easy to implement. The invention is not limited to any particular manner of implementing control signals on the memory or to the manner of managing FIFOs once established.

Figure 4:
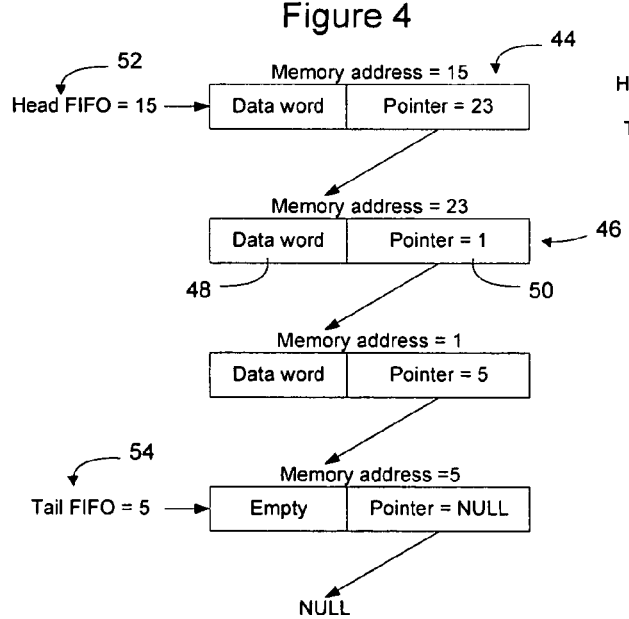
FIG. 4 is a functional block diagram illustrating a linked list FIFO data structure according to an embodiment of the invention.

FIG. 4 illustrates an embodiment of the invention in which FIFOs may be implemented using linked list data structures, so that any given FIFO may use any quantity of the shared memory.

To enable FIFOs to share the memory, the area of the memory to be used to implement the FIFOs is initially reserved as a pool of free memory that can be used by any FIFO requiring memory space. When a FIFO requires a memory location, the memory location is allocated to the FIFO. Whenever a FIFO releases a memory location, that memory location is returned to the free memory pool. Although the invention will be described in connection with FIFOs, other memory structures may be implemented as well and the invention is not limited to an implementation that uses a FIFO memory structure.

In the embodiment illustrated in FIG. 4, both the FIFO and the free memory pool of available memory addresses are implemented using a data structure referred to herein as a linked list. In a linked list data structure 44, each memory location 46 includes a data structure having two fields: a data field 48, which is used to store a data word to be saved in the FIFO, and a pointer field 50, which is used to address the next memory location belonging to the next memory address in the linked list.

A head_fifo register 52 contains the address of the first memory location belonging to the FIFO. A tail_fifo register 54 contains the address of the last memory location belonging to the FIFO. The data field 48 of the memory location addressed by the content of the tail_fifo register is left "empty," i.e., it does not contain a data word because it is reserved for the next enqueue operation, as explained below. Similarly, the pointer field 50 of the memory location addressed by the content of the tail_fifo register is set to NULL since the next memory location for the FIFO has not been determined.

For example, in FIG. 4, the linked list includes three filled memory locations and an empty memory location. Memory location at memory address 15 includes a data word and a pointer to memory address 23. The memory location at memory address 23 includes a data word and a pointer to memory address 1. The memory location at memory address 1 includes a data word and a pointer to memory address 5. The memory location at memory address 5 is empty, and ready for an enqueue operation to write data to the FIFO. By obtaining a memory address location and reserving that memory address for a subsequent enqueue operation, the FIFO always contains a free memory location to receive a data word when data is received to be stored in the FIFO.

Figure 5:
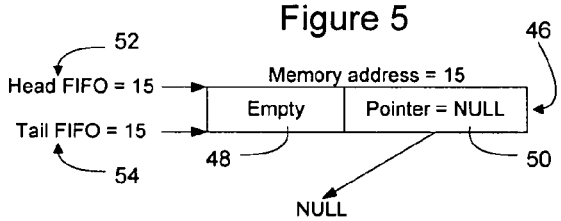
FIG. 5 is a functional block diagram of an empty linked list FIFO data structure according to an embodiment of the invention.

An empty FIFO is shown in FIG. 5. As shown in FIG. 5, an empty FIFO has the head_fifo register set to the same memory address as the tail_fifo memory address, and the memory location at the memory address is empty to allow the FIFO to process a subsequent enqueue operation.

Figure 6A:
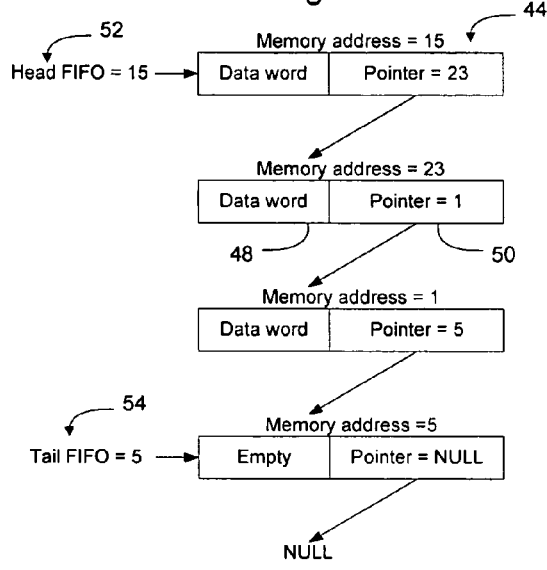
FIGS. 6A and 6B are a functional block diagrams illustrating an enqueue operation on the linked list FIFO data structure of FIG. 4.
Figure 6B:
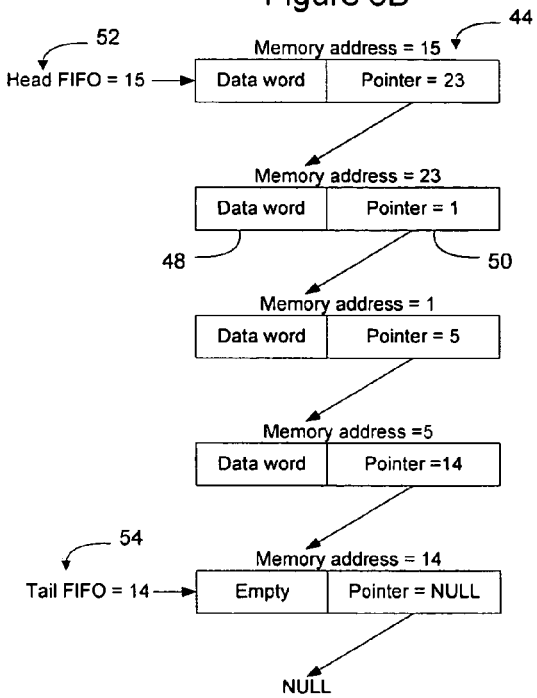

FIGS. 6A and 6B illustrate a process of executing an enqueue operation on the FIFO of FIG. 5. As shown in FIGS. 6A and 6B, when an enqueue operation is issued, the data word to be stored in the FIFO is written to the data field of the memory location addressed by the content of the tail_fifo register, a free memory address is written to the pointer field of the memory location addressed by the tail_fifo register, and the value of the tail_fifo register is set to the memory address of the memory location that was just written into the pointer field. Thus, in the example illustrated in FIGS. 6A-6B, a data word is written into the data field 48 at memory location 5, and a new free memory address (memory location 14) is assigned to the FIFO and written into the pointer field at memory location 5. The tail FIFO is changed to refer to memory address 14, to complete the enqueue operation. The memory location at memory address 14 is empty to receive a subsequent data word and new pointer for a subsequent enqueue operation.

Once a memory location is assigned to a particular FIFO, it is no longer a free memory location but rather is allocated to that FIFO. Note that the actual content of the data and pointer fields of the last memory location of the FIFO is not relevant. Thus, the memory location may contain old data or the memory location may be erased or set to all zeros or any other information. The figures have illustrated these data fields as being set to "empty" and "NULL" but the invention is not limited in this manner as the content of these fields is irrelevant to the FIFO.

Figure 7A:
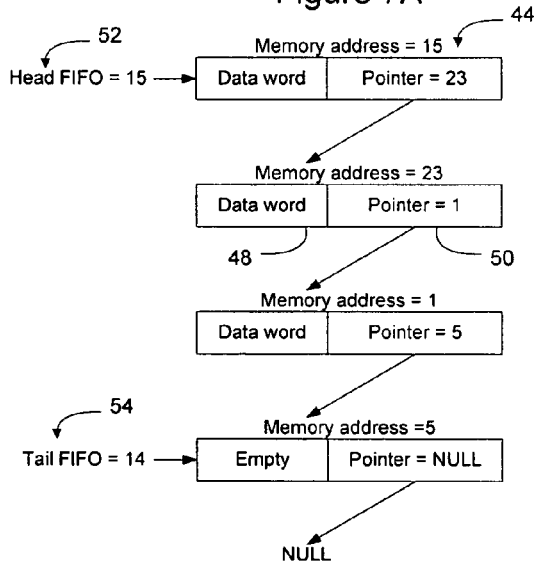
FIGS. 7A and 7B are a functional block diagrams illustrating a dequeue operation on the linked list FIFO data structure of FIG. 4.
Figure 7B:
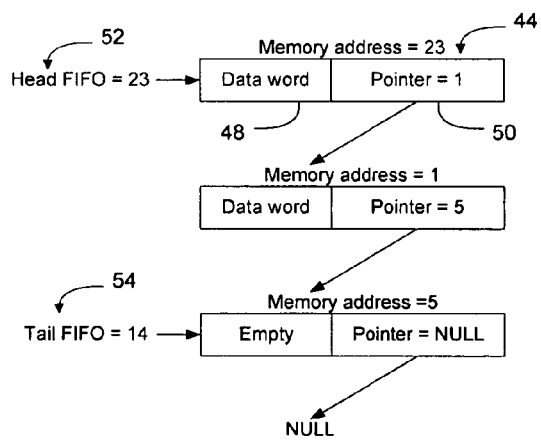

FIGS. 7A-7B illustrate a process of executing a dequeue operation on a FIFO such as the FIFO of FIG. 5. When a dequeue operation is issued, the data field 48 of the memory location addressed by the content of the head_fifo register 52 is returned, and the head_fifo register 52 is set to the value contained in the pointer field 50 at that memory location. The memory location associated with the previous value of the head_fifo register is then returned to the free memory pool to be used by any FIFO that requires a free memory location.

In a linked list data structure, the integrity of the FIFO depends on the pointer values maintained in the pointer fields 50. Thus, if a pointer is damaged, the rest of the linked list is lost, which causes data loss and memory loss. Accordingly, it may be advantageous to incorporate a way to detect (and perhaps recover from) bit errors occurring in the pointer value. There are many techniques that can be used to detect or correct errors, such as by performing a cyclic redundancy check (CRC), parity check, or performing forward error correction (FEC). The invention is not limited to any particular technique of detecting or correcting errors. For example, one simple solution may be to store the binary complement of the pointer value along with the pointer value and compare both values before using the pointer value. This technique allows for the detection of errors and the identification of which bits are in error. The invention is not limited to this embodiment, however. Where an error occurs and is not correctable, the FIFO will need to be re-initialized thus resulting in a loss of data.

Since a data plane of a network element is expected to handle data that is arriving at a very high rate of speed, often at up to 10 Gigabits per second, to be useful the FIFOs must be able to be implemented in hardware, since a software implementation using available technology would either be too slow or too expensive to be practicable.

To allow an enqueue and dequeue operation to be executed during each clock cycle of the FIFO controller, a new free memory location must be provided to the FIFO during every clock cycle. Specifically, as discussed above, an enqueue operation results in the FIFO writing a data word and the memory address of a free memory location to the FIFO. Thus, an enqueue operation may only be performed each clock cycle if a new free memory location is able to be provided during each clock cycle. Assuming this is possible, as discussed in greater detail below, an enqueue operation simply performs one memory write and a tail_fifo register update each clock cycle.

A dequeue operation, however, requires that the new head_fifo value be known and transferred to the memory read circuit by the next clock transition. This is very difficult to achieve, if not economically impossible, even for an embedded memory, i.e., a memory located on the same chip as the FIFO controller. Specifically, due to memory, logic, and hardware pipeline delays, the data read from a memory is usually available a few clock transitions after the memory read operation is issued. Therefore, the dequeue operations will return data with a delay of a few clock cycles. Since a dequeue operation requires the head_fifo register to be updated from the value of the pointer, the head_fifo register will not be updated for several clock cycles while the memory executes the read instruction on the previous pointer field of the previous memory location. Thus, a simple linked list may take several clock cycles to update the head_fifo register, which precludes a dequeue operation from occurring during every clock cycle. Since dequeue operations affect the availability of free memory locations, as the free memory locations are used up, the delay in effecting dequeue operations may affect the ability of the memory to perform enqueue operations as well.

Figure 8:
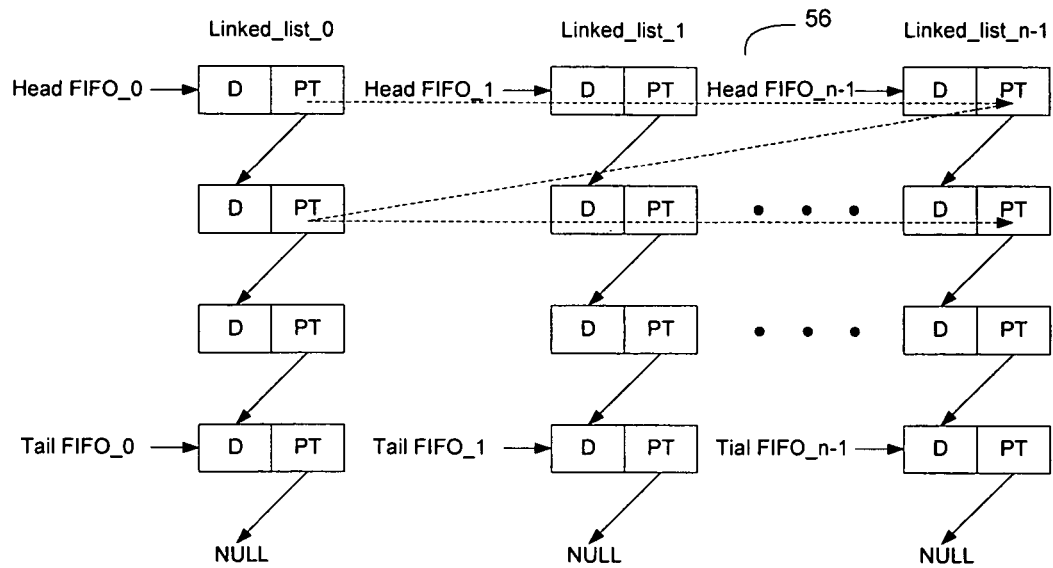
FIGS. 8 and 9 are functional block diagrams of an interleaved linked list FIFO data structure, illustrating dequeue and enqueue operations, respectively, according to an embodiment of the invention.
Figure 9:
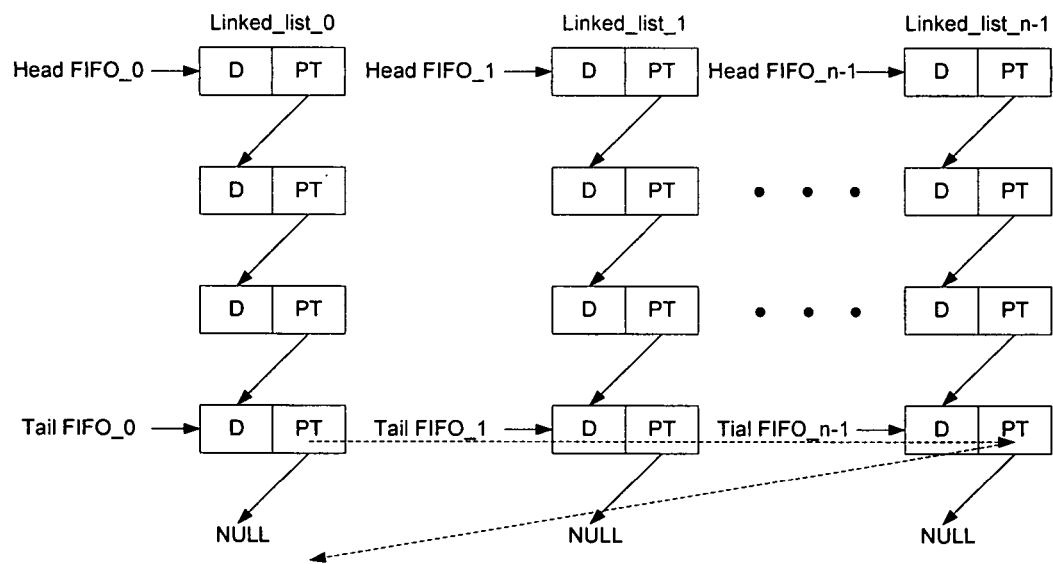
Figure 10:
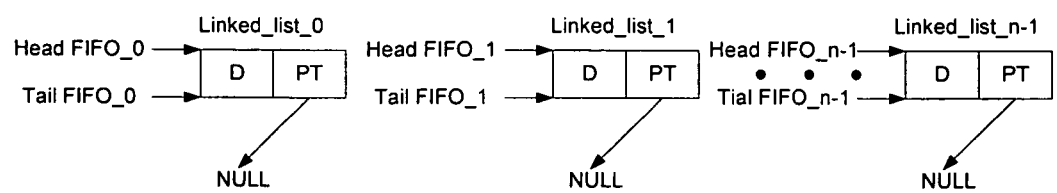
FIG. 10 is a functional block diagram of an empty interleaved linked list FIFO data structure according to an embodiment of the invention.

According to an embodiment of the invention, multiple linked lists are interleaved to enable dequeue operations to be performed on the memory during every clock cycle. FIGS. 8-10 illustrate an example of several interleaved linked lists according to an embodiment of the invention. The number of interleaved linked lists may be adjusted depending on the type of memory being used, the number of click cycles it takes to return data from a data read instruction, and other factors. For example, if it takes 8 clock cycles to return the value of a pointer from a data read instruction, 8 linked lists may be interleaved to pipeline the read cycles so that the data may be updated in time to execute a subsequent dequeue operation. The set of linked lists that are interleaved together form a given FIFO in the shared memory. Thus, a memory having 24 FIFOs would include 24 sets of interleaved linked lists, each set of interleaved linked lists forming one of the FIFOs.

For example, assume that a dequeue operation in a linked list, as discussed above, takes n clock cycles to complete—that is it takes n clock cycles to update the content of the head_fifo register after executing a read instruction on the pointer field associated with the previous memory location. If a single linked list is used, a dequeue operation may be executed on the memory every n clock cycles. However, if n linked lists are interleaved, and dequeue operations are executed on the n linked lists successively, the head_fifo registers for each of the linked lists may be provided with n clock cycles for their respective head_fifo registers to be updated, before that linked list in the interleaved structure will be required to execute another dequeue operation. Assuming transactions may be pipelined in the memory, and that a pipelining implementation has been used such that subsequent linked list dequeue operations may be initiated before the head_fifo register of a previous linked list has been updated, it is possible to execute a dequeue operation on the FIFO during each clock cycle.

As illustrated in FIG. 8, each linked list in the interleaved structure has its own head_fifo and tail_fifo registers. Where the interleaved linked lists are all empty, the head_fifo and tail_fifo registers for each linked list in the interleaved structure will point to respective memory locations as illustrated in FIG. 10. This may occur at initialization where all linked lists of a FIFO are empty, or where the queues are emptied during a run-time environment.

To enable the lists to be dequeued in a particular order, the FIFO controller uses a next_dequeue register to maintain an indication of which linked list in the interleaved structure is to be used for the next dequeue operation. Initially, this register can point to any linked list.

For example, in the embodiment illustrated in FIG. 8, it will be assumed that the next_dequeue register initially points to linked list 0. When a dequeue operation is issued, a dequeue operation is performed on that linked list, just as it would have been performed on a linked list not included in an interleaved structure as discussed above in connection with respect to FIGS. 7A and 7B, and a read operation is issued to update the head_fifo_0 register with the value of the pointer at the present memory location. The next_dequeue register will also be updated to point to the next linked list, which in this example is linked list 1. The register next_dequeue can be updated following the sequence of linked lists from 0 to n−1 and back to 0, or it can follow any other order, as long as it always uses the same order. By the time a dequeue operation is issued again on the first linked list 0, the head_fifo_0 register will already have been resolved. That is, the interleaving technique is used to allow individual linked lists to complete their dequeue operations and update the head_fifo register before they are required to perform another dequeue operation. Therefore, the degree of interleaving, i.e., n in this example, should be chosen large enough to allow for completion of a dequeue operation before next_dequeue register points again to the same linked list. Note that from the point of view of an external circuit making use of the FIFO controller, interleaved linked lists are completely unperceivable. In the embodiment illustrated in FIG. 8, the dequeue sequence will follow the dashed lines 56. Although as mentioned above, the dequeue sequence may follow any desired sequence.

Since the enqueue and dequeue operations are independent and may take place on different linked lists, the FIFO controller also uses a register called next_enqueue to indicate the next linked list to be used for enqueue operations. Maintaining the enqueue operations independent of the dequeue operations allows the FIFO to contract or expand as traffic demands change over time. Initially, the next_enqueue register will point to the same linked list as the linked list initially used for next_dequeue register. As enqueue operations are performed, this register will be updated to point to the next successive linked list. The next_dequeue register will follow the same linked list order as the next_enqueue register to allow data to be read from the interleaved linked lists in the same order as it was written to the interleaved linked lists.

In the example illustrated in FIGS. 8-9, it will be assumed that the next_enqueue is currently assigned to point to linked list 0. When an enqueue operation is issued, an enqueue operation is performed as described above in connection with FIGS. 6A-6B, and the next_enqueue register is updated to point to the next linked list following the same sequence that is being used to update the next_dequeue register.

Figure 11:
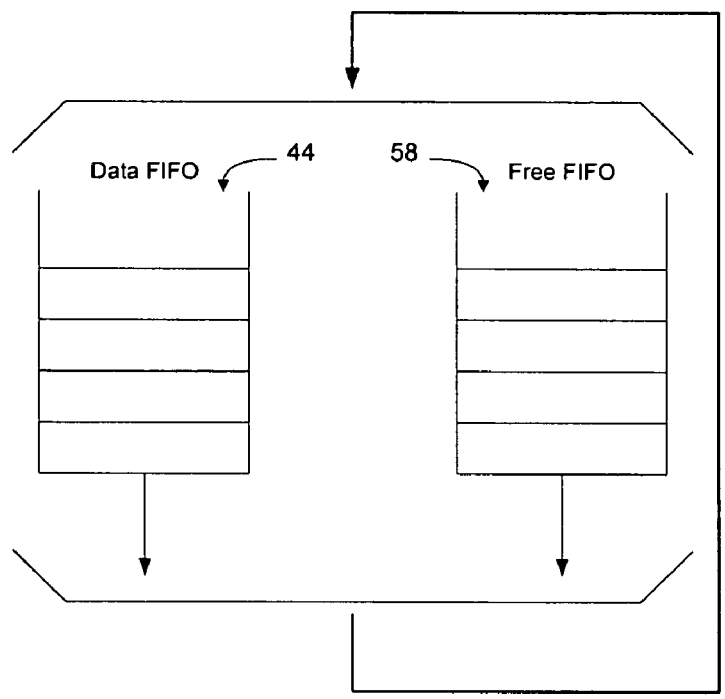
FIG. 11 is a functional block diagram of a system for providing free memory locations to a FIFO formed using a linked list or interleaved linked list data structure according to an embodiment of the invention.
Figure 12:
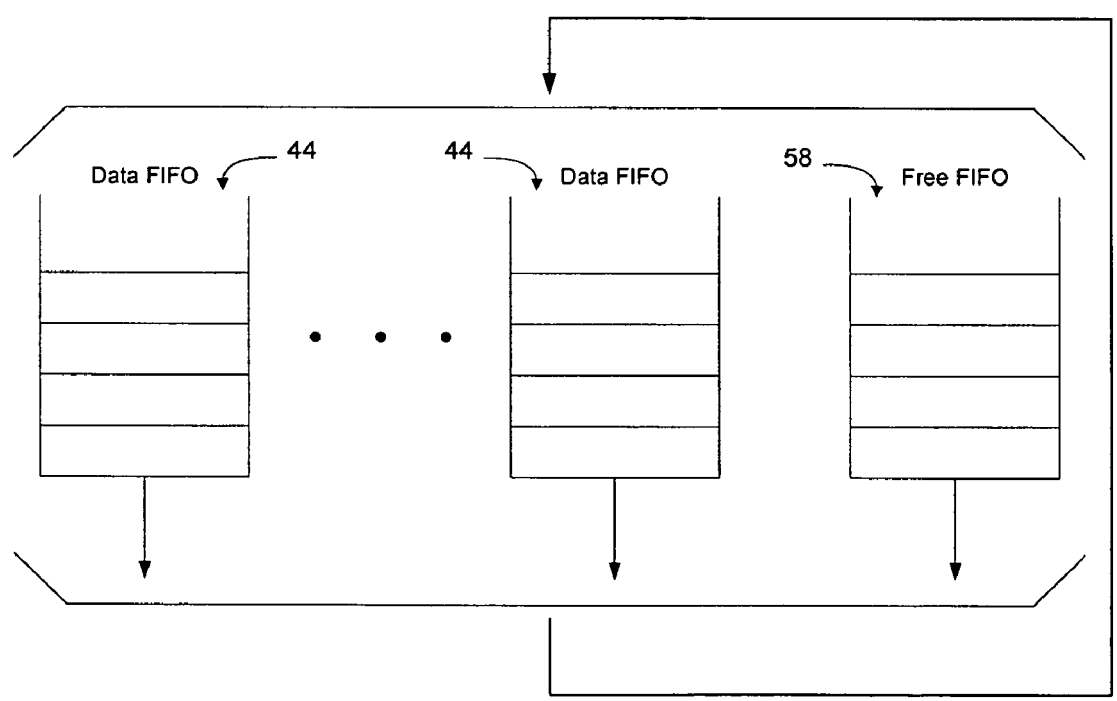
FIG. 12 is a functional block diagram of a system for providing free memory locations to multiple FIFOs formed in a shared memory using linked list or interleaved linked list data structures according to an embodiment of the invention.

In the preceding examples and embodiments, it was assumed that the FIFOs were able to be supplied with a free memory at every clock cycle. Enqueue operations need a constant supply of free memory locations so that an enqueue operation may be performed at every clock cycle. According to an embodiment of the invention, a free pool of memory is also organized as an interleaved linked list. This free memory list will be referred to herein as a free memory FIFO (or free FIFO 58 for short), as opposed to the data FIFO 44, which is used to store the actual FIFO data as discussed in greater detail above. FIG. 11 illustrates an embodiment in which the shared memory supports one data FIFO 44 and a free FIFO 58, and FIG. 12 illustrates an embodiment in which the memory supports multiple data FIFOs 44 and a free FIFO 58. Since the memory in the examples set forth herein is capable of performing only one dequeue operation and one enqueue operation per clock cycle regardless of the number of data FIFOs supported by the memory, only one free memory location will be required for each clock cycle. Accordingly, only one free FIFO will be required per physical memory. Where the memory is able to support multiple enqueue operations per clock cycle, multiple free FIFOs may be used to supply multiple free memory locations per clock cycle.

Initially, the data FIFO will be empty and the free FIFO will contain an interleaved linked list of all free memory locations in the memory that are available for use by the FIFOs on that memory. The data fields at the memory locations of the free FIFO are not used and may contain any information, as the data fields will be ignored by the network element.

A dequeue operation on a FIFO results in the generation of a free memory location. For example, where the memory location is being used by a data FIFO, a dequeue operation from the data FIFO results in data being read from the memory location and, thus, the memory location becomes a free memory location. According to an embodiment of the invention, after the FIFOs have been initialized, at every clock transition for which a dequeue operation is not issued on the data FIFO, a dequeue operation is issued on the free FIFO. As a result, a free memory location is produced at every clock transition; either by the dequeue operation on the data FIFO or the dequeue operation on the free FIFO.

Since there will thus be a free memory location generated at each clock cycle, the free memory location must be used during every clock cycle. According to an embodiment of the invention, if a data FIFO enqueue operation is not issued on a clock transition, an enqueue operation is then issued on the free FIFO. In this manner, the free memory location may either be used by a data FIFO or added back to the free FIFO to be made available at a later time. In this manner, at every clock transition in which a data FIFO does not undergo a dequeue or enqueue operation, the free memory FIFO is concurrently dequeued and enqueued.

Since a dequeued memory location becomes free only after its data and pointer fields are examined, and memory read operations may take a few clock cycles to complete, free memory locations will be provided only a few clock cycles after the FIFO controller is started. Accordingly, care must be taken to provide immediate free memory locations during the first few clock cycles after the controller is initiated. Those immediate free locations can be reserved, i.e., kept outside the free memory FIFO, to allow the FIFO to start smoothly.

Since a given shared memory may need to support several data FIFOs, a new linked list may be generated for each data FIFO to be added to the shared memory. The memory will support one enqueue and one dequeue operation per clock cycle, although these operations do not need to be on the same data FIFO. Thus, the manner in which the FIFOs are created using interleaved linked lists, and the manner in which free memory locations are supplied, does not impose any restriction on the order in which FIFOs are written or read. For instance, a scheduler can serve one word at a time from different data FIFOs in a round-robin fashion or it may read consecutive words from a single FIFO until a complete frame is served, if desired. The invention is not limited to any particular manner of selecting FIFOs to be read from a shared memory.

The proposed scheme uses all of the available throughput of the memory, i.e., it can write data to the FIFOs at the allowed write throughput of the memory and can read data from the FIFOs also at the allowed read throughput of the memory. For example, if a static memory has a 128-bit data bus (i.e., it is 16 bytes wide) for the read port and a 128-bit data bus for the write port and one memory location is read and one memory location is written at every 12.8 ns, the memory has a 10 Gb/s read throughput and a 10 Gb/s write throughput. With this memory, 10 Gb/s traffic may pass through the FIFOs without experiencing congestion.

It should be understood that all functional statements made herein describing the functions to be performed by the methods of the invention may be performed by software programs implemented utilizing subroutines and other programming techniques known to those of ordinary skill in the art.

The control logic may be implemented as a set of program instructions that are stored in a computer readable memory within the network element and executed on a microprocessor, such as a network processor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A First In First Out (FIFO) data structure in a physical memory, comprising:
   at least first and second separate linked lists collectively forming the FIFO data structure, each of the linked lists having a plurality of memory locations, each memory location including a data field and a pointer field, wherein a pointer field of an earlier memory location in a given linked list points to a memory address of a subsequent memory location in that same linked list, and where the first and second separate linked lists are interleaved such that consecutive data words to be stored in the FIFO will be stored on different ones of the first and second separate linked lists, and such that data is read from the FIFO data structure by reading memory locations of the first and second separate linked lists in a selected order.

2. The FIFO data structure of claim 1, further comprising a head_fifo register representing a dequeue memory location address, and a tail_fifo register representing an enqueue memory location address.

3. The FIFO data structure of claim 2, wherein the enqueue memory location address is empty prior to an enqueue operation.

4. The FIFO data structure of claim 1, wherein an enqueue operation on the FIFO data structure causes a data word to be written to one of the memory locations in the first linked list and then to a memory location in the second linked list.

5. The FIFO data structure of claim 1, further comprising a free memory data structure configured to supply free memory locations to the first linked list to perform an enqueue operation at each clock cycle of the physical memory.

6. A method of sharing a pool of available memory between a plurality of first in first out (FIFO) memory structures, the method comprising the steps of:
   establishing a plurality of FIFO memory structures in the pool of available memory, each FIFO memory structure including at least first and second separate linked lists, the at least first and second separate linked lists being interleaved and collectively forming the FIFO memory structure, each of the separate linked lists having a plurality of memory locations, each memory location including a data field and a pointer field, wherein a pointer field of an earlier memory location in a given linked list points to a memory address of a subsequent memory location in that same linked list, and wherein the first and second separate linked lists of a given FIFO are interleaved such that consecutive data words to be stored in the FIFO will be stored on different ones of the first and second separate linked lists; and
   enqueuing data words into the interleaved linked lists to write the data words to the FIFO.

7. The method of claim 6, further comprising the step of retrieving from a pool of available memory, free memory addresses for use with the step of enqueuing data words into the linked list memory structures.

8. The method of claim 7, wherein the pool of available memory comprises the free memory addresses, and wherein any of the plurality of linked lists may use any of the free memory addresses.

9. The method of claim 6, wherein successive enqueue operations iterate across the multiple interleaved linked lists.

10. The method of claim 9, wherein the enqueue operations are controlled by a successive enqueue register for that plurality of linked lists.

11. The method of claim 9, wherein successive dequeue operations iterate across the multiple interleaved linked lists in the same order as the successive enqueue operations.

12. The method of claim 11, wherein the dequeue operations are controlled by a successive dequeue register for that plurality of linked lists.

* * * * *